July 5, 1927.
W. THORNER
1,634,760
APPARATUS FOR PROJECTING MULTICOLOR IMAGES IN CINEMATOGRAPHY
Filed May 14, 1924
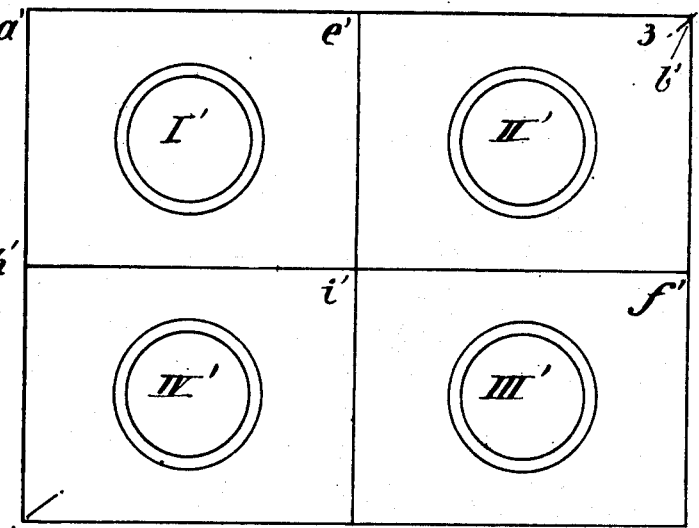
Fig. 2.
Fig. 1.
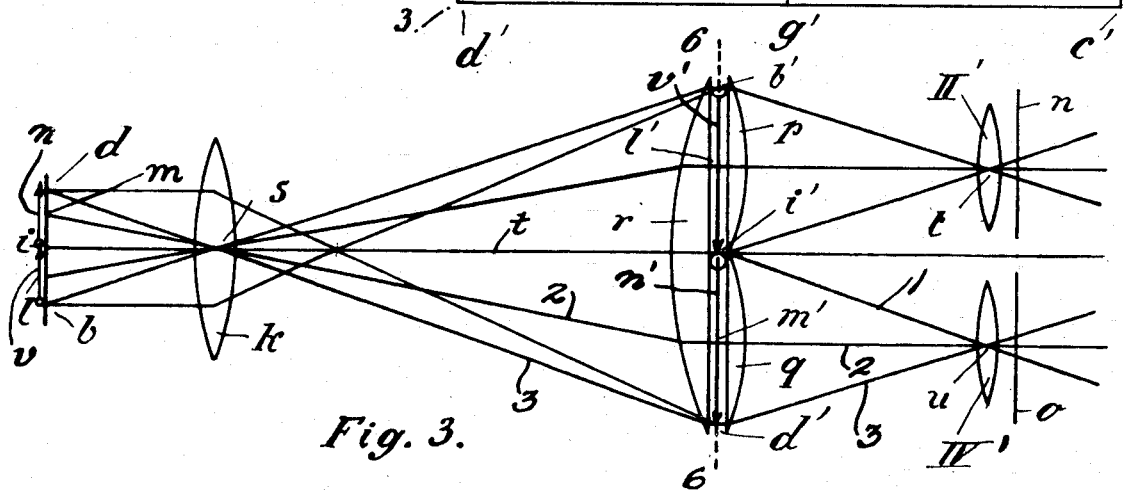
Fig. 3.
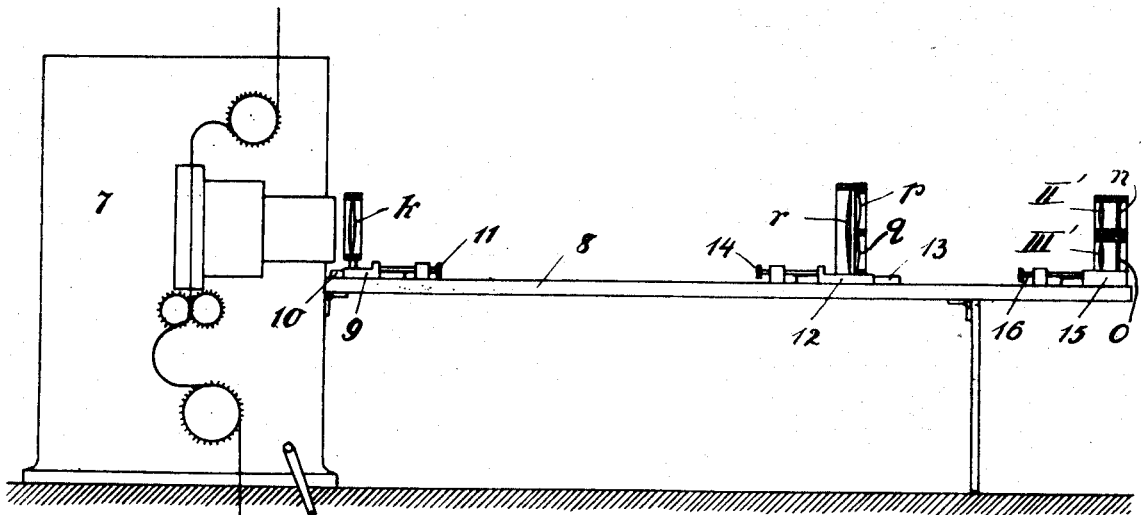
Fig. 4.
Witnesses:
Charlotte Böhm
Hedwig Kohlase
Inventor:
Walter Thorner
by Franz Neinhold
Attorney.

Patented July 5, 1927.

UNITED STATES PATENT OFFICE.

1,634,760

WALTER THORNER, OF BERLIN, GERMANY.

APPARATUS FOR PROJECTING MULTICOLOR IMAGES IN CINEMATOGRAPHY.

Application filed May 14, 1924, Serial No. 713,341, and in Germany May 24, 1923.

My invention relates to improvements in the apparatus for projecting multi-color images in cinematography, and more particularly in the apparatus in which sets of pictures provided on successive film band sections and color screens cooperate by the additive method to produce the images.

In apparatus of this type a film might be used in which the film sections are divided by two crossing lines into four fields, and in which the color records are produced on the fields by means of separate photographic lens systems and color filters, each of the lens systems being provided when projecting the images with a color filter of its own, or two of the systems being provided with a color filter of the same color. In systems of this class the distance of the optical axes of the photographic lenses is equal to one half of the height of the picture, which is ordinarily 9 millimeters, and, therefore, the diameter of each lens and its mounting is not larger than 9 millimeters. This diameter is sufficient in photographic lenses for producing the pictures on the film band, which lenses or lens systems have a focal distance of not more than 25 millimeters, so that the aperture, that is the ratio of the diameter and the focal distance of the lens is ⅓. The short relative distance of the lenses is desirable because the individual pictures do not suffer from parallaxis.

However, pictures thus produced can not be projected through the lenses by means of which they have been made, because by reason of the small diameter of such lenses the light transmitted to the screen is insufficient to produce a brilliant image. Even if focusing lenses are used for projection the focal distance of which is the double of that of the lenses used for taking the photographs, the result is not satisfactory because the relative distance of the lenses can not be increased.

The object of the improvements is to provide a system by means of which images of sufficient brilliancy are projected on the screen, and with this object in view I provide means for producing enlarged images of the sectional pictures of the film band, and means for projecting each of the enlarged sectional images through a focusing lens of its own. By thus enlarging the sectional pictures of the film band the relative distance of the lenses used for projecting the enlarged images is increased so far that the diameter of the glasses is sufficient to throw enough light on the screen.

For the purpose of explaining the invention an example embodying the same has been shown in the accompanying drawing in which the same reference characters have been used in all the views to indicate corresponding parts. In said drawing, Fig. 1, is a diagrammatical view illustrating the method of taking four photographs of an object, looking in the direction of the optical axis of a camera provided with four lenses, Fig. 2, is a diagrammatical view of the projecting apparatus looking in the direction of the path of the rays and from the side of the screen, Fig. 3, is a diagrammatical sectional view of the projecting system taken on the line 3—3 of Fig. 2, and Fig. 4, is a diagrammatical elevation of the system as used in connection with a cinematographic projection apparatus.

In Fig. 1 I have shown a section $a$—$b$—$c$—$d$ of a film band 5 of standard size, which is divided into four fields $a$—$e$—$i$—$h$, $e$—$b$—$f$—$i$, $i$—$f$—$c$—$g$, and $h$—$i$—$g$—$d$. On the said fields four photographs of the object are taken by means of four lenses, I, II, III, and IV and color screens of different colors, as is known in the art.

In Figs. 2 and 3 I have illustrated the manner of projecting the images on a screen, Fig. 3 indicating the projection of two arrows $v$ and $w$ representing a picture made in the fields $e$—$b$—$f$—$i$ and $h$—$i$—$g$—$d$ of the film band and showing rays emanating from certain points of the said arrows, and in order that the object of the successive lenses be clearly understood I shall describe the lenses in the succession in which they may be assumed to be added to the system for performing the desired function.

In front of the film band 5 there is a focusing lens $k$ of large diameter and common to all the fields of the film sections successively passing at the rear of the lens. By means of the said lens enlarged images $a'$—$e'$—$i'$—$h'$, $e'$—$b'$—$f'$—$i'$, $i'$—$f'$—$c'$—$g'$ and $h'$—$i'$—$g'$—$d'$ are produced substantially in a plane represented in Fig. 3 by the broken line 6—6. The images of the center 1 of the film picture $e$—$b$—$f$—$i$ and the center $m$ of the film picture $h$—$i$—$g$—$d$ appear at $l'$ and $m'$ respectively. Fig. 3 shows the geometrical construction of the arrows v and w representing the film pictures. For projecting the said enlarged images on the screen object glasses I', II', III' and IV' one for each image are provided, Fig. 3 showing only two glasses II' and IV'. However, when following the direction of the rays it will be understood that only a small part of the rays emanating from the said enlarged images would impinge on the object glasses I', II', III' and IV'. Therefore, for directing the said rays towards the object glasses I'—II'—III'—IV' a condenser r is provided by means of which the rays are refracted so that the main rays 1, 2, 3 are substantially parallel. Preferably the said condenser is disposed slightly at the rear of the plane 6—6 of the enlarged image, so that the enlarged image is, as a matter of fact, slightly reduced in size. But even now only a part of the rays refracted by the condenser r would pass through the focusing lenses I', II', III', IV'. Therefore, for avoiding a loss of light for each enlarged image a further condenser is provided in front of the condenser r, Fig. 3 showing two of the said condensers P and Q. By the said additional condensers the rays emanating from each field of the enlarged image are refracted towards the cooperating object glass I', II', III', and IV'. In Fig. 3 I have shown the main rays 1, 2 and 3 passing from the field h—i—g—d through the object glass IV'.

After passing through the object glasses I', II', III', IV' the rays pass through color filters n, o, whereupon they are combined on a screen.

For example, if the focal distance of the lens k is 9 centimeters, and the distance i—s 12 centimeters, the distance s—i' will be 36 centimeters, and the size of the image b'—d' is three times that of the film picture b—d. Further, if l'—t is 18 centimeters and the diameter of the focusing lens k 4 centimeters, the free diameter of the focusing lenses II' and IV' will be 2 centimeters, and the film picture is magnified in the same way as when projecting a picture of normal size through a lens having a focal distance of 12 centimeters. As there are four apertures of a diameter of 2 centimeters, the effect is equal to that of a single aperture of 4 centimeters, or a projection lens of normal brilliancy.

My improved system comprises two groups of optical elements, one of said groups consisting of the focusing lens k and the condenser r, and the other of the four focusing lenses I', II', III' and IV' and four condensers two of which have been indicated by the letters of reference p and q. The condenser r of one group and the condensers p, q etc. of the other group are in close relation to each other and substantially in the plane of the enlarged image of the film, and the focusing lens k of one group is at the side of the film band, and the focusing lenses I', II', III' and IV' at the side of the screen.

When reducing the distance i—s between the film band 5 and the focusing lens k the distance s—i' between the said lens k and the enlarged image is increased. Therefore the plane 6—6 of the enlarged image is moved away from the film band and a larger image is projected on the screen. In the practice of the invention the condensers p, q, etc. and the focusing lenses I', II', III' and IV' are mounted so as to be shiftable towards and away from the lens k. Thereby the system can always be adjusted so that the enlarged image is produced within the same plane relatively to the condensers p, q etc., and that it is accurately projected on the screen, while the main rays of the sectional images converge. Each distance of the screen requires a convergence of its own of the main rays of the sectional images, and this convergence can readily be obtained by shifting the focusing lens k, the condensers, and the focusing lenses I', II', III' and IV' in the direction of the optical axis, without changing the relative distance of the focusing lenses I', II', III' and IV'.

I prefer to construct the system so that it can be attached to any cinematographic apparatus, which can therefore be used at will for black-and-white projection or for multicolor projection. As shown in Fig. 4, to the casing 7 enclosing the film band operating mechanism a plate 8 is hinged on which my system is mounted. The lens k is disposed on a slide 9 slidable in guide ways 10 and adjustable by means of a screw 11, and the condensers r, p, q etc. and the lenses I', II', III' and IV' and color screens n, o, etc. are mounted on slides 12 and 15 respectively slidable in guide ways 13 and 15 and adjustable by means of screws 14 and 16.

While in describing the invention reference has been made to a particular example embodying the same I wish it to be understood that my invention is not limited to the construction shown in the drawing, and that various changes may be made in the general arrangement of the apparatus and the construction of its parts without departing from the invention.

I claim:

1. A system of the class described, comprising means for producing enlarged images of the successive film sections containing cooperating color records, and separate means one for each of the images of the color records for projecting said enlarged images of the color records.

2. A system of the class described, comprising a focusing lens for producing images of the successive film sections containing cooperating color records, a condenser for condensing the rays producing the enlarged images of the color records, and separate condensers and separate focusing lenses for separately projecting the enlarged images of the color records.

3. A system of the class described, comprising a cinematographic projection apparatus having a focusing lens for producing images of the successive film sections containing cooperating color records, a condenser for condensing the rays producing the enlarged images of the color records, and separate condensers and separate focusing lenses for separately projecting the enlarged images of the color records, said condensers and focusing lenses being shiftable in the direction of the optical axis.

4. A system of the class described comprising a cinematographic projection apparatus, a focusing lens adapted to produce enlarged images of the successive film sections containing cooperating color records, a condenser for condensing the rays producing the enlarged images of the color records, separate condensers and separate focusing lenses for separately projecting said enlarged images of the color records, and a support removably connected with said cinematographic apparatus and carrying said lens and condenser producing the enlarged images and said separate condensers and lenses.

In testimony whereof I hereunto affix my signature.

WALTER THORNER.